US012280750B2

(12) United States Patent
Li et al.

(10) Patent No.: US 12,280,750 B2
(45) Date of Patent: Apr. 22, 2025

(54) AUTOMATIC PRESSURE REGULATING VALVE FOR ELECTRO-PNEUMATIC BRAKING SYSTEM OF COMMERCIAL VEHICLE AND CONTROL METHOD THEREOF

(71) Applicant: Wuhan University Of Technology, Wuhan (CN)

(72) Inventors: Gangyan Li, Wuhan (CN); Hanwei Bao, Wuhan (CN); Jian Hu, Wuhan (CN); Fang Yang, Wuhan (CN)

(73) Assignee: Wuhan University Of Technology, Wuhan (CN)

( * ) Notice: Subject to any disclaimer, the term of this patent is extended or adjusted under 35 U.S.C. 154(b) by 555 days.

(21) Appl. No.: 17/726,484

(22) Filed: Apr. 21, 2022

(65) Prior Publication Data
US 2023/0016714 A1    Jan. 19, 2023

Related U.S. Application Data

(63) Continuation of application No. PCT/CN2021/109031, filed on Jul. 28, 2021.

(30) Foreign Application Priority Data

Jul. 19, 2021 (CN) .......................... 202110811029

(51) Int. Cl.
*B60T 13/68* (2006.01)
*B60T 15/02* (2006.01)
(52) U.S. Cl.
CPC .......... *B60T 13/683* (2013.01); *B60T 15/027* (2013.01)
(58) Field of Classification Search
CPC ...... B60T 13/683; B60T 15/027; B60T 15/20; B60T 8/1831; Y10T 137/2409; Y10T 137/87225; Y10T 137/86919

(Continued)

(56) References Cited

U.S. PATENT DOCUMENTS 3,944,294 A * 3/1976 Masuda ................ B60T 8/1831
                                                                                    303/9.66
5,813,730 A * 9/1998 Force .................... B60T 13/665
                                                                                    303/3

(Continued)

FOREIGN PATENT DOCUMENTS

CN       101312864 A     11/2008
CN       108883759 A     11/2018

(Continued)

OTHER PUBLICATIONS

Internation Search Report of PCT/CN2021/109031, Mailed Apr. 20, 2022.

*Primary Examiner* — Bradley T King
*Assistant Examiner* — James K Hsiao
(74) *Attorney, Agent, or Firm* — True Shepherd LLC; Andrew C. Cheng

(57) ABSTRACT

An automatic pressure regulating valve for an electro-pneumatic braking system of a commercial vehicle comprises an upper valve body and a lower valve body. The upper valve body includes a normally open switching valve, a quick-acting intake valve, a normally open quick-acting intake valve, a quick-acting exhaust valve, and a control chamber A. A lower valve body includes a relay valve and a working chamber B. The normally open switching valve has a manually controlled air inlet a and an electronically controlled air inlet b, and an air outlet c connected to an air inlet d of the normally open quick-acting intake valve. An air outlet e of the normally open quick-acting intake valve, an air inlet f of the quick-acting exhaust valve and an air outlet i of the quick-acting air intake valve are connected together to the control chamber A.

9 Claims, 9 Drawing Sheets

(58) Field of Classification Search
USPC .................................................. 303/3
See application file for complete search history.

(56) References Cited

U.S. PATENT DOCUMENTS

| | | | | |
|---|---|---|---|---|
| 6,206,481 B1* | 3/2001 | Kaisers | ................ | B60T 15/027 |
| | | | | 303/118.1 |
| 6,264,286 B1* | 7/2001 | Ehrlich | ................... | B60T 8/323 |
| | | | | 303/7 |
| 6,669,308 B1 | 12/2003 | Aurich et al. | | |
| 6,769,744 B2* | 8/2004 | Marsh | .................... | B60T 15/20 |
| | | | | 137/102 |
| 6,955,409 B2* | 10/2005 | Neuhaus | ............... | B60T 8/4818 |
| | | | | 303/193 |
| 7,389,795 B2* | 6/2008 | Potter | ................... | B60T 8/361 |
| | | | | 137/625.68 |
| 7,677,527 B2* | 3/2010 | Szymaszek | ............. | F16K 31/42 |
| | | | | 251/30.01 |
| 8,651,588 B2 | 2/2014 | Bensch et al. | | |
| 8,864,247 B2 | 10/2014 | Hilberer | | |
| 8,899,387 B2* | 12/2014 | Shaw | ..................... | B60T 8/327 |
| | | | | 137/627.5 |
| 9,387,846 B2* | 7/2016 | Sell | ....................... | B60T 8/349 |
| 9,709,994 B2* | 7/2017 | Vogt | .................. | G05D 16/0672 |
| 10,730,499 B2* | 8/2020 | Otremba | ............... | B60T 13/662 |
| 2010/0025141 A1* | 2/2010 | Bensch | ................ | B60T 13/683 |
| | | | | 180/271 |
| 2021/0237703 A1* | 8/2021 | Henderson | ............ | B60T 13/662 |
| 2023/0015629 A1* | 1/2023 | Li | ........................ | B60T 15/027 |

FOREIGN PATENT DOCUMENTS

| | | |
|---|---|---|
| CN | 109733364 A | 5/2019 |
| CN | 109823331 A | 5/2019 |
| EP | 0394065 A2 | 10/1990 |
| IN | 210978304 U | 7/2020 |

* cited by examiner

AUTOMATIC PRESSURE REGULATING VALVE FOR ELECTRO-PNEUMATIC BRAKING SYSTEM OF COMMERCIAL VEHICLE AND CONTROL METHOD THEREOF

CROSS-REFERENCE TO RELATED APPLICATIONS

This application is a continuation of International Patent Application No. PCT/CN2021/109031 with a filing date of Jul. 28, 2021, designating the United States, and further claims priority to Chinese Patent Application No. 202110811029.8 with a filing date of Jul. 19, 2021. The content of the aforementioned applications, including any intervening amendments thereto, are incorporated herein by reference.

TECHNICAL FIELD

The present disclosure relates to the technical field of vehicle braking, and in particular, to a novel automatic pressure regulating valve for an electro-pneumatic braking system of a commercial vehicle and a control method thereof.

BACKGROUND ART

Automatic vehicle driving has become an inexorable development trend. A braking system of a vehicle is one of core parts of the whole vehicle and plays an important role in guaranteeing the safety of traffic participants and improving the driving comfort and stability of a driver. Automatic vehicle driving is inevitably accompanied by automatic and intelligent vehicle braking. Braking systems of vehicles have been upgraded from the traditional manually controlled air braking system to an electro-pneumatic braking system. As a core control element in the electro-pneumatic braking system, an automatic pressure regulating valve is required to accurately the outlet pressure thereof and the pressure of a brake chamber in real time as required so as to achieve the ideal braking state of the vehicle and meeting the requirements of automatic driving.

In the traditional air braking system of a vehicle, the pressure of the brake chamber is mainly regulated by using elements such as an anti-lock braking system (ABS) valve and a relay valve. Unfortunately, the pressure cannot be regulated as required, and due to the defects of long pressure response time, slow pressure regulation and insufficient accuracy, the requirements of automatic and intelligent vehicle braking cannot be met. At present, the research on the electro-pneumatic braking system and the automatic pressure regulating valve is still at the initial stage.

The utility model patent No. 201920145987.4 discloses an electronically controlled automatic pressure regulating valve for air braking of a vehicle, which includes a proportional valve having an input port connected to an air storage tank and an output port connected to a brake chamber and can realize automatic regulation of the pressure of the brake chamber of the vehicle by opening and closing a first switching valve and a second switching valve. Limited by the inherent characteristic of a one-way valve, this utility model has the following disadvantage: the air in a control chamber cannot be vented in case of failure of electronic control, and therefore, the vehicle cannot be released from braking.

Hence, an urgent technical problem to be solved is to provide an automatic pressure regulating valve for an electro-pneumatic braking system of a vehicle and a control method thereof, which can realize quick and accurate regulation of the pressure of the brake chamber, have high reliability and stability and maintain the "fail-safe" function.

SUMMARY

The technical problem to be solved in the present disclosure is to provide an automatic pressure regulating valve for an electro-pneumatic braking system of a commercial vehicle and a control method thereof to solve the problems of difficulty in realizing automatic driving and poor driving experience due to long vehicle braking response time and failure to accurately regulate the braking pressure as required in the prior art.

The present disclosure adopts the following technical solutions to solve the technical problem:

An automatic pressure regulating valve for an electro-pneumatic braking system of a commercial vehicle includes an upper valve body and a lower valve body. The upper valve body includes a normally open switching valve, a quick-acting intake valve, a normally open quick-acting intake valve, a quick-acting exhaust valve, and a control chamber A. The lower valve body includes a relay valve and a working chamber B. The control chamber A is located above a piston, while the working chamber B is located below the piston. The control chamber A and the working chamber B are spaced apart from each other to allow the piston to move therebetween. The normally open switching valve has a manually controlled air inlet a and an electronically controlled air inlet b that are connected to a pedal valve and an air storage tank, respectively, and an air outlet c connected to an air inlet d of the normally open quick-acting intake valve. An air outlet g of the quick-acting exhaust valve is connected to a muffler. An air inlet h of the quick-acting intake valve is connected to the air storage tank. An air outlet e of the normally open quick-acting intake valve, an air inlet f of the quick-acting exhaust valve and an air outlet i of the quick-acting air intake valve are connected together to the control chamber A.

In the above technical solution, the lower valve body is a relay valve. A piston is disposed in a valve cover. An upper protrusion structure of the piston cooperates with a guide groove of the valve cover for guiding the piston. A spring seat, a stop collar, a rubber muffler, a main spring, a spring collar, and a main valve core are all disposed in a valve seat. The stop collar is disposed in a bottom groove of the valve seat. The spring seat is disposed above the stop collar. The main spring sleeves the spring seat. The spring collar sleeves the main spring. The main valve core capable of moving up and down is disposed in the spring seat. The rubber muffler is disposed in the spring seat and below the main valve core. A first sealing ring is disposed between the piston and the valve cover. A second sealing ring is disposed between the valve cover and the valve seat. A third sealing ring is disposed between the spring seat and the valve seat. A fourth sealing ring is disposed between the main valve core and the spring seat. A fifth sealing ring sleeves a middle lug boss of the main valve core. A sixth sealing ring sleeves the top of the main valve core. The piston is capable of moving up and down to come into contact with or separate from the sixth sealing ring. The working chamber B of the relay valve has an air inlet j connected to the air storage tank of the electro-pneumatic braking system of the vehicle, an air outlet k connected to a brake chamber and an exhaust port 1 connected to the rubber muffler. The piston moves down to push the main valve core to compress the main spring, thereby communicating the air inlet j and the air outlet k of the working chamber B. The main valve core is driven by a spring force of the main spring to move upwards to break the connection between the air inlet j and the air outlet k of the working chamber B. The working chamber B is communicated with the exhaust port 1 when a lower side of the piston is separated from the sixth sealing ring at the top of the main valve core.

According to the above technical solution, a movable iron core is disposed at the top of the normally open switching valve in the upper valve body. The movable iron core is connected to an electromagnetic valve core which is sleeved with a static iron core. A coil is disposed in the static iron core. An electromagnetic valve return spring is disposed in a lower end groove of the electromagnetic valve core. An upper valve core sealing ring is disposed between the electromagnetic valve core and the static iron core, while a middle valve core sealing ring sleeves the middle of the electromagnetic valve core and a lower valve core sealing ring is disposed between the electromagnetic valve core and a valve cover. A static iron core sealing ring is disposed between the static iron core, and an end cover and the valve cover. When the coil is de-energized, the movable iron core and the electromagnetic valve core are situated at an upper limit position under the action of a spring force, and the manually controlled air inlet a is communicated with the air outlet c. When the coil is energized, the movable iron core presses down the electromagnetic valve core and the spring, and the electronically controlled air inlet b is communicated with the air outlet c.

According to the above technical solution, an annular sharp protrusion structure is formed on a lower portion of the piston to achieve a linear seal between the piston and the main valve core.

According to the above technical solution, the normally open switching valve, the normally open quick-acting intake valve, the quick-acting exhaust valve and the quick-acting intake valve are all mounted above the valve cover, and an end cover connected to the valve cover is disposed at the top. The valve cover is connected to the valve seat.

According to the above technical solution, the air inlet a and the air outlet c of the normally open switching valve are normally open. The air inlet d and the air outlet e of the normally open quick-acting intake valve are normally open. The air inlet f and the air outlet g of the quick-acting exhaust valve are normally closed. The air inlet h and the air outlet i of the quick-acting intake valve are normally closed. Manually controlled braking and electronically controlled braking are switched by de-energizing and energizing the normally open switching valve. When the normally open switching valve is de-energized, the manually controlled air inlet a is communicated with the air outlet c, and the manually controlled braking is maintained. When the normally open switching valve is energized, the electronically controlled air inlet b is communicated with the air outlet c to enable electronically controlled braking. An outlet pressure of the automatic pressure regulating valve is regulated as required.

According to the above technical solution, the normally open quick-acting intake valve in the upper valve body is similar to the normally open switching valve in structure except that the normally open quick-acting intake valve has only one air inlet d which is connected to the air outlet c of the normally open switching valve. When the coil of the normally open quick-acting intake valve is de-energized, the air inlet d is communicated with the air outlet e. When the coil of the normally open quick-acting intake valve is energized, the air inlet d is disconnected from the air outlet e.

According to the above technical solution, the quick-acting exhaust valve and the quick-acting intake valve are normally closed. The air inlet and the air outlet of each of the quick-acting exhaust valve and the quick-acting intake valve are disconnected at the beginning. When the coil is energized, the movable iron core is attracted to move downwards to press down the electromagnetic valve core and the spring such that the air inlet is communicated with the air outlet.

This is because the quick-acting exhaust valve and the quick-acting intake valve in the upper valve body are similar to the normally open quick-acting intake valve in structure except that the quick-acting exhaust valve and the quick-acting intake valve are normally closed.

According to the above technical solution, when the normally open switching valve, the normally open quick-acting intake valve and the quick-acting intake valve in the upper valve body are opened at the same time, air from the pedal valve and compressed air in the air storage tank may enter the control chamber A through two intake loops, respectively, thus achieving coupled control on the pressure of the control chamber A.

According to the above technical solution, when the normally open switching valve, the normally open quick-acting intake valve, the quick-acting exhaust valve and the quick-acting intake valve are all de-energized, the air from the pedal valve can enter the control chamber A through the normally open switching valve and the normally open quick-acting intake valve. The loop formed by the pedal valve, the air inlet a of the normally open switching valve, the air outlet c of the normally open switching valve, the air inlet d of the normally open quick-acting intake valve, the air outlet e of the normally open quick-acting intake valve and the control chamber A is enabled, and the driver can change the pressure of the control chamber A by means of the pedal valve and then control the pressure of the brake chamber. Thus, the manually controlled braking in the non-electronic control state is achieved.

According to the above technical solution, a controller may switch manually controlled braking and electronically controlled braking by controlling de-energization and energization of the normally open switching valve, and may also control the normally open switching valve to be de-energized to enter the manual braking mode at a certain level of the opening of the brake valve when the normally open switching valve is energized.

According to the above technical solution, a pressure detection hole m is formed at the pressure outlet of the working chamber B. The pressure detection hole m is connected to a pressure sensor. The pressure sensor is connected to the controller and feeds back the outlet pressure signal of the working chamber B.

According to the above technical solution, the controller is connected to the normally open switching valve, the normally open quick-acting intake valve, the quick-acting exhaust valve, the quick-acting intake valve, and the pressure sensor.

The present disclosure further provides a control method of an automatic pressure regulating valve for an electro-pneumatic braking system of a commercial vehicle. The control method includes the following steps:

(1) setting, by the electro-pneumatic braking system of the vehicle, a target braking pressure $P_1$ based on actuation for a brake pedal and a driving state of the vehicle, or based on only the driving state of the vehicle;

(2) converting, by a controller, the target braking pressure into a control signal, and regulating a pressure of a control chamber A by controlling de-energization and energization of coils of a normally open switching valve, a normally open quick-acting intake valve, a quick-acting exhaust valve and a quick-acting intake valve coil;

(3) detecting, by a pressure sensor, a pressure $P_2$ at a pressure outlet of a working chamber B, and feeding back the pressure to the controller for comparison with the target braking pressure $P_1$;

(4) when $P_2$ is lower than $P_1$, controlling, by the controller, opening and closing of the quick-acting intake valve, the normally open quick-acting intake valve, and the quick-acting exhaust valve, increasing the pressure of the control chamber A and increasing the opening of an intake valve of the automatic pressure regulating valve, causing $P_2$ to rise;

(5) when $P_2$ is higher than $P_1$, controlling, by the controller, opening and closing of the quick-acting intake valve, the normally open quick-acting intake valve and the quick-acting exhaust valve, reducing the pressure of the control chamber A, closing the intake valve of the automatic pressure regulating valve and communicating the working chamber B with the exhaust port 1, causing $P_2$ to drop; and (6) controlling, by the controller, the quick-acting intake valve, the normally open quick-acting intake valve and the quick-acting exhaust valve to act repeatedly, and regulating an outlet pressure of the automatic pressure regulating valve, i.e. the $P_2$, to be equal to the target braking pressure $P_1$.

Compared with the prior art, the automatic pressure regulating valve provided in the present disclosure is applicable to autonomous vehicles and manually driven vehicles at various levels. Electronic control and manual control are combined, allowing for the electronic control to perform real-time correction on manual control and online switching of two control modes. The electromagnetic valve structure is improved to support a plurality of levels of automatic driving. The safety can be guaranteed by manual control after electronic control is disabled. The quick-acting intake valve can execute the electronically controlled braking function after the normally closed quick-acting intake valve or the normally open switching valve is disabled. In other words, the electronic control function supports safety backup. The specific advantages are as follows:

(1) To meet requirements of intelligent and automatic driving and braking of a vehicle, a reliable pressure regulating valve and a control method are provided for an electro-pneumatic braking system of the vehicle.

(2) The automatic pressure regulating valve can regulate the pressure of the brake chamber in real time quickly and accurately according to braking requirements, thereby effectively improving the braking performance of the vehicle.

(3) Different braking modes are proposed for different development stages of automatic driving, which can be applied to a purely manually controlled braking mode, a mode relying mainly on manually controlled braking and secondarily on electronically controlled braking, a mode relying mainly on electronically controlled braking and allowing autonomous access of manually controlled braking, and a purely electronically controlled braking mode.

(4) The pressure of the control chamber A can be controlled by coupled manual control and electronic control or independently by manual control or electronic control. When the electronic control is disabled, the automatic pressure regulating valve and the electro-pneumatic braking system therefore have the braking backup capability.

BRIEF DESCRIPTION OF THE DRAWINGS

To describe the technical solutions in the specific embodiments of the present disclosure or the prior art more clearly, the accompanying drawings required for describing the specific embodiments or the prior art will be briefly described below. Apparently, the accompanying drawings in the following descriptions show merely some embodiments of the present disclosure, and other accompanying drawings can be derived from these drawings by a person of ordinary skill in the art without creative efforts.

Figure 1:
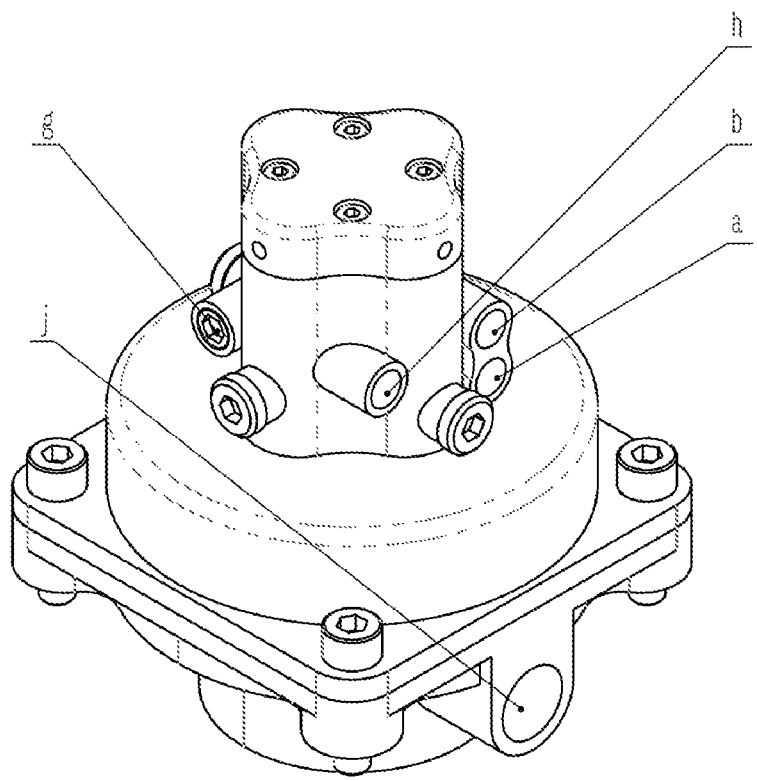
FIG. 1 is a three-dimensional outside view according to the present disclosure.
Figure 2:
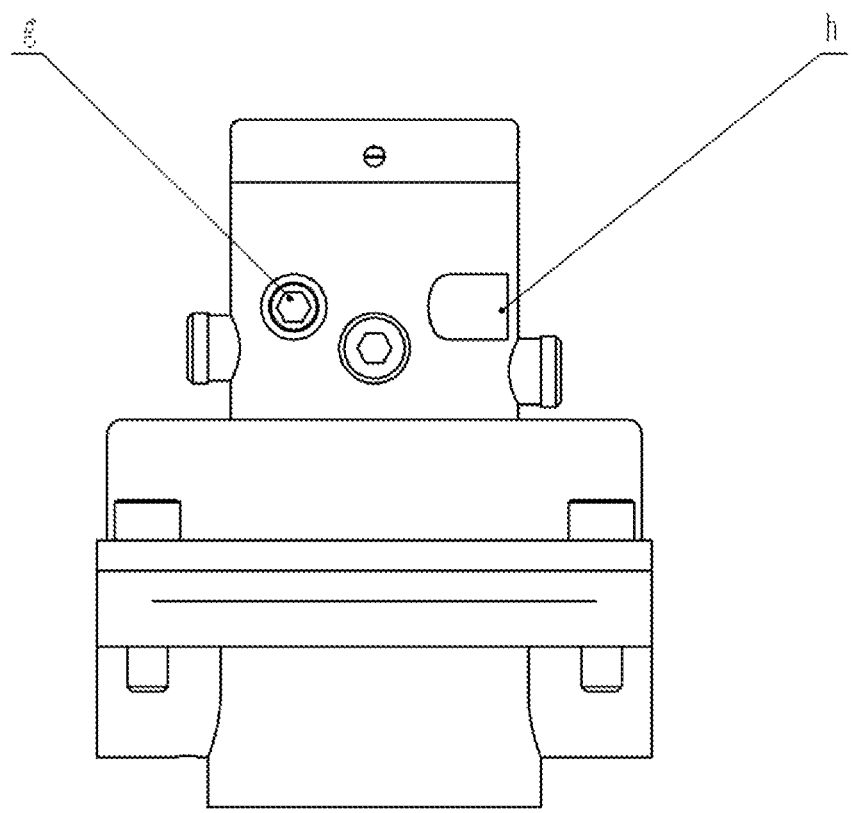
FIG. 2 is a left view according to the present disclosure.
Figure 3:
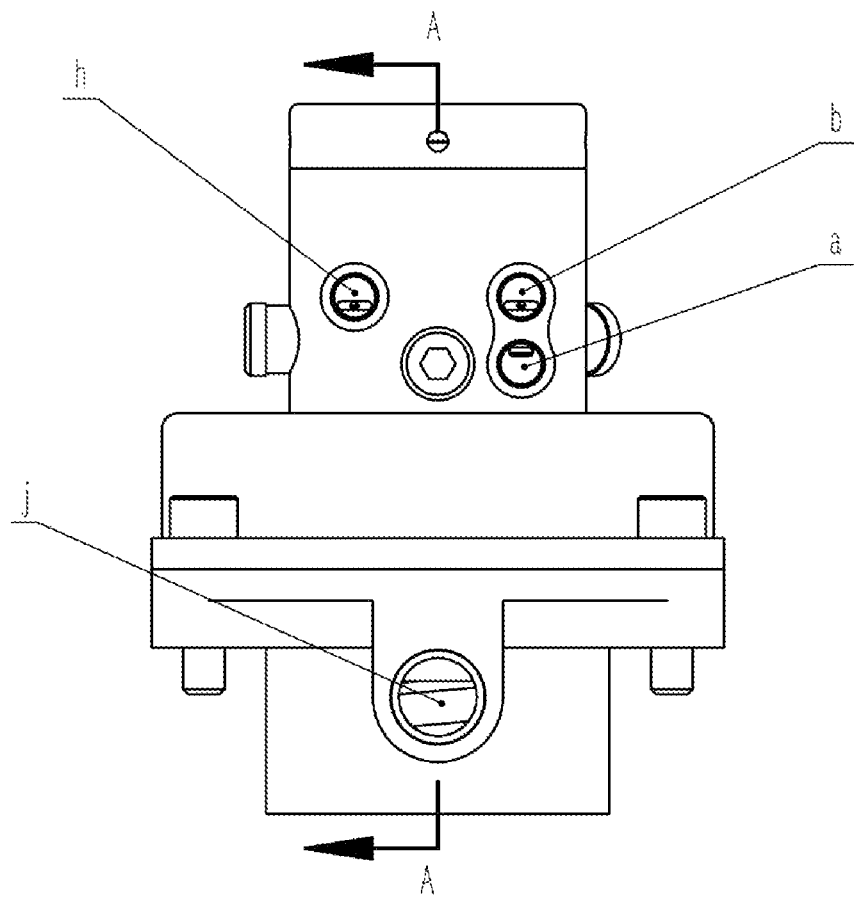
FIG. 3 is a front view according to the present disclosure.
Figure 4:
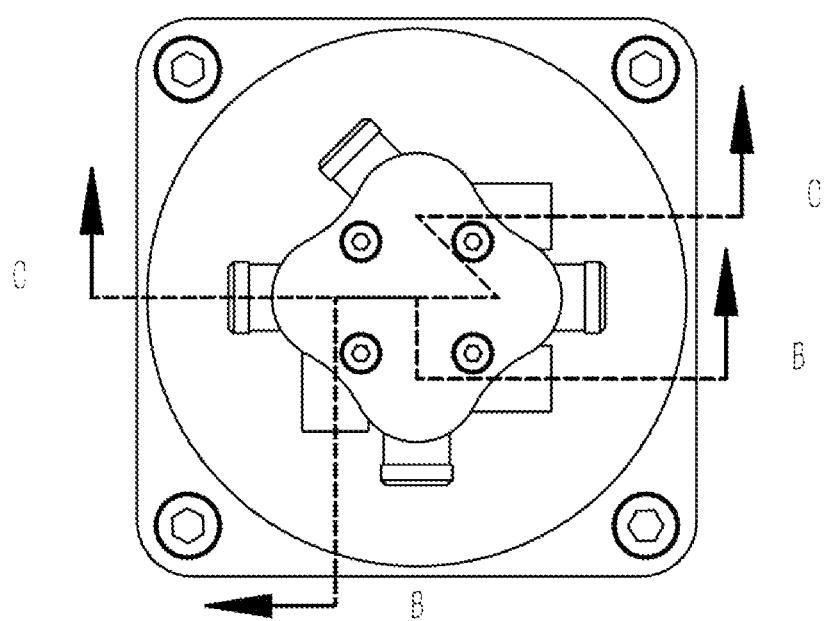
FIG. 4 is a top view of FIG. 2.
Figure 5:
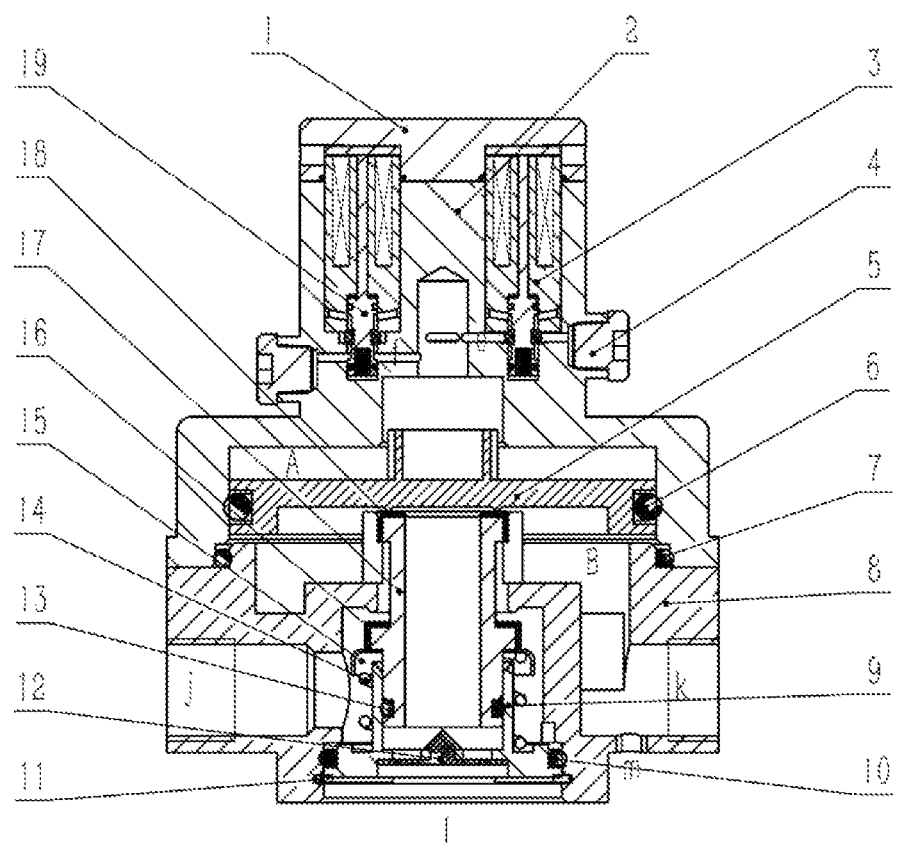
FIG. 5 is a cross-sectional view taken along line A-A in FIG. 3.
Figure 6:
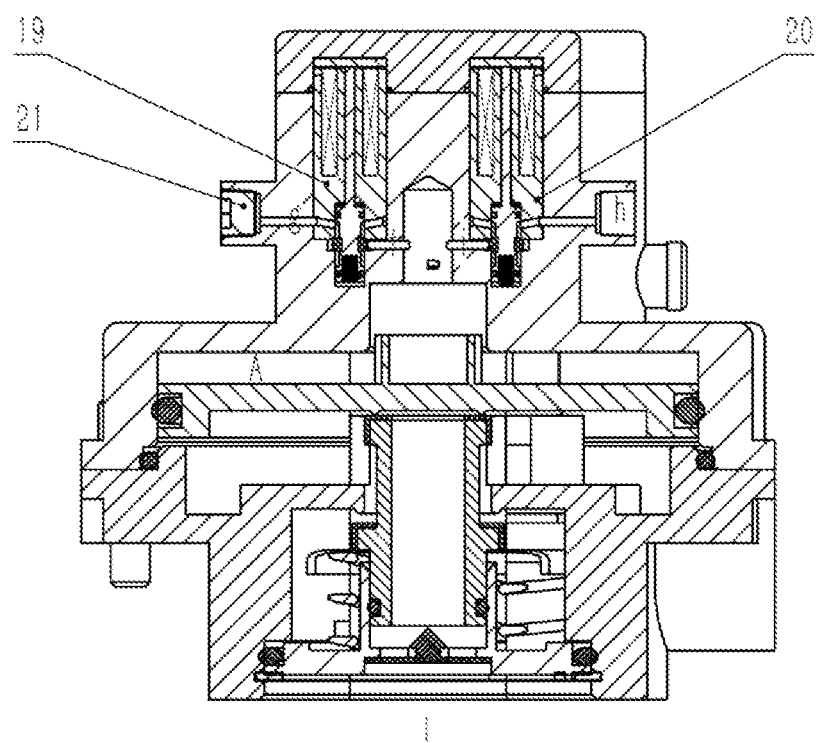
FIG. 6 is a cross-sectional view taken along line B-B in FIG. 4.
Figure 7:
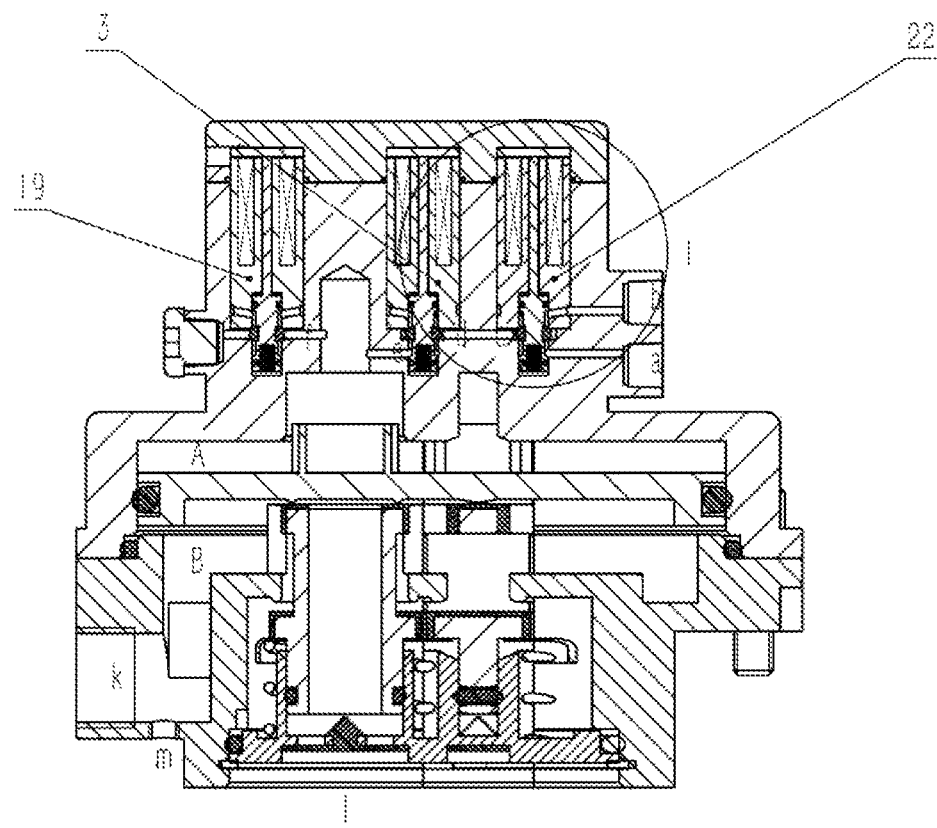
FIG. 7 is a cross-sectional view taken along line C-C in FIG. 4.

List of Reference Numerals: 1—end cover, 2—valve cover, 3—normally open quick-acting intake valve, 4—plug, 5—piston, 6—first sealing ring, 7—second sealing ring, 8—valve seat, 9—spring seat, 10—third sealing ring, 11—stop collar, 12—rubber muffler, 13—fourth sealing ring, 14—main spring, 15—spring collar, 16—fifth sealing ring, 17—main valve core, 18—sixth sealing ring, 19—quick-acting exhaust valve, 20—quick—acting intake valve, 21—muffler, 22—normally open switching valve, 23—static iron core sealing ring, 24—coil, 25—static iron core, 26—lower valve core sealing ring, 27—electromagnetic valve return spring, 28—electromagnetic valve core, 29—middle valve core sealing ring, 30—upper valve core sealing ring, 31—movable iron core, 32—controller, a-manually controlled air inlet of normally open switching valve, b-electronically controlled air inlet of normally open switching valve, c-air outlet of normally open switching valve, d-air inlet of normally open quick-acting intake valve, e-air outlet of normally open quick-acting intake valve, f-air inlet of quick-acting exhaust valve, g-air outlet of quick-acting exhaust valve, h-air inlet of quick-acting intake valve, i-air outlet of quick-acting intake valve, j-air inlet of relay valve, k-air outlet of relay valve, l-exhaust port of relay valve, m-pressure detection hole, n-controller power interface, o-controller signal interface, A-control chamber, and B-working chamber.

DETAILED DESCRIPTION OF THE EMBODIMENTS

Embodiments of the present disclosure will be described below with specific examples in conjunction with the accompanying drawings. Other advantages and effects of the present disclosure will become readily apparent to those skilled in the art from the contents disclosed by this specification. While the present disclosure will be described with reference to preferred embodiments, the features of the present disclosure are not limited to the embodiments. Rather, the description of the present disclosure in conjunction with the embodiments is intended to cover other choices or modifications that may be derived from the claims of the present disclosure. To provide a deep understanding of the present disclosure, many specific details will be described below. The present disclosure may also be implemented without such details. In addition, to avoid confusing or obscuring the key points of the present disclosure, some specific details will be omitted in the description. It should be noted that the examples in the present disclosure or features in the examples may be combined in a non-conflicting manner. All other examples derived by a person of ordinary skill in the art without creative efforts shall fall within the protection scope of the present disclosure.

It should be noted that similar reference numerals and letters used herein represent similar items in the accompanying drawings below. Therefore, once an item is defined in one drawing, it does not need to be further defined and described in subsequent drawings.

In the description of the examples, it should be noted that orientations or position relationships indicated by terms such as "upper", "lower", "left", "right", "inner", and "outer" are orientation or position relationships shown in the accompanying drawings or when the product of the present disclosure is usually placed in operation. These terms are only used to facilitate description of the present disclosure and simplify the description, but not to indicate or imply that the mentioned apparatus or components must have a specific orientation or must be established and operated in a specific orientation, and thus these terms cannot be understood as a limitation to the present disclosure.

In addition, the terms such as "first", "second", and "third" are used only for the purpose of description and cannot be construed as indicating or implying relative importance.

In the description of the present disclosure, it should be further noted that, unless otherwise clearly specified and limited, meanings of terms "disposed", "connected with" and "connected to" should be understood in a broad sense. For example, the connection may be a fixed connection, a removable connection, or an integral connection; it may be a mechanical connection or an electrical connection; it may be a direct connection or an indirect connection by using an intermediate medium; or it may be intercommunication between two components. A person of ordinary skill in the art may understand specific meanings of the above-mentioned terms in the utility model based on a specific situation.

As shown in FIG. 1 to FIG. 9, the present disclosure provides a novel automatic pressure regulating valve for an electro-pneumatic braking system of a vehicle, which includes an upper valve body and a lower valve body. The upper valve body includes parts such as an end cover 1, a valve cover 2, a plug 4, and a muffler 21, as well as components such as normally open quick-acting intake valve 3, a quick-acting exhaust valve 19, a quick-acting intake valve 20, and a normally open switching valve 22. The connection relationships among such parts and components can be seen from FIG. 5 to FIG. 7.

An air inlet a and an air inlet b of the normally open switching valve 22 are connected to a pedal valve and an air storage tank, respectively. An air outlet c of the normally open switching valve 22 is connected to an air inlet d of the normally open quick-acting air inlet valve 3. An air outlet g of the quick-acting exhaust valve 19 is connected to the muffler 21. An air inlet h of the quick-acting intake valve 20 is connected to the air storage tank. An air outlet e of the normally open quick-acting intake valve 3, an air inlet f of the quick-acting exhaust valve 19 and an air outlet i of the quick-acting air intake valve 20 are connected together to a control chamber A.

Figure 8:
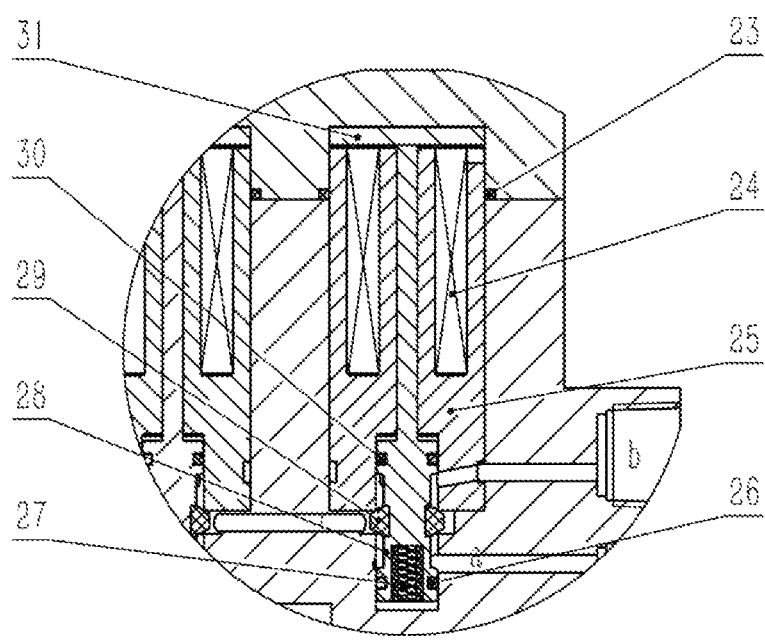
FIG. 8 is a partially enlarged view of area I in FIG. 7.
Figure 9:
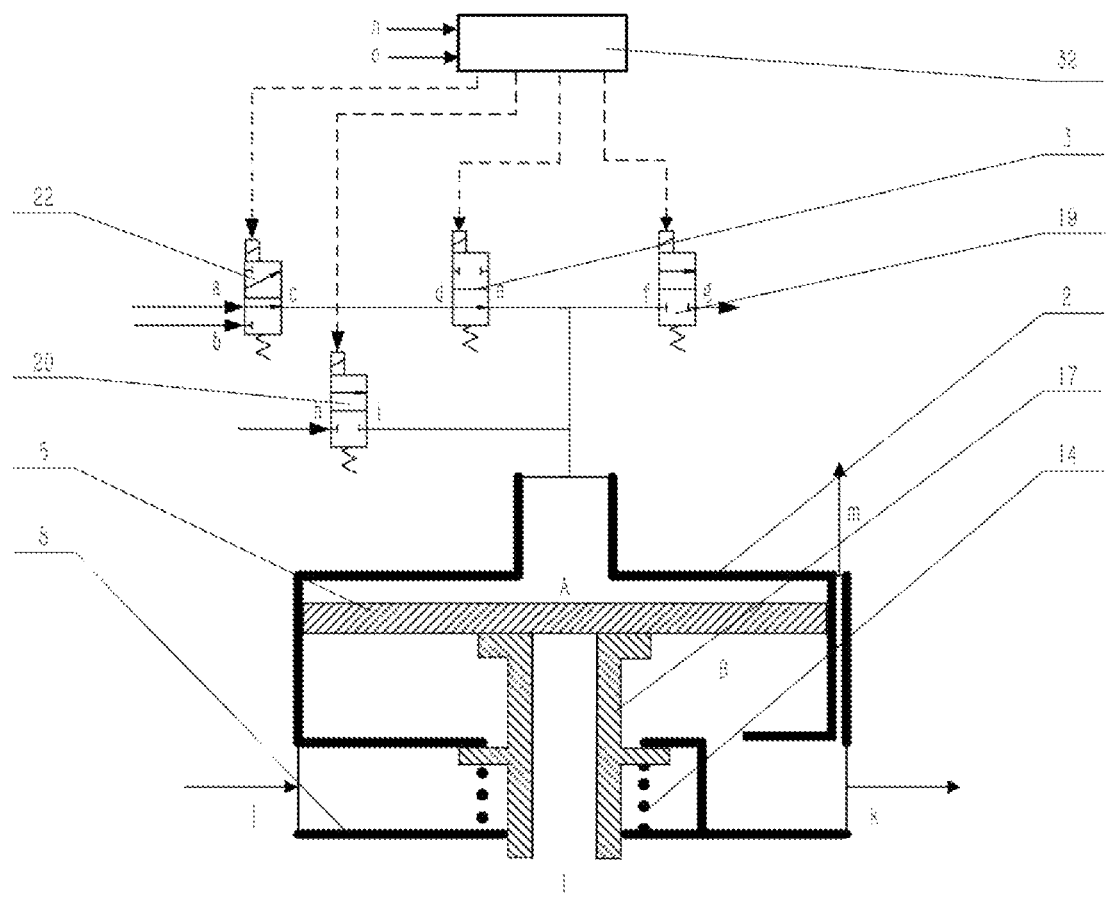
FIG. 9 is a schematic diagram according to the present disclosure.

The structure of the normally open switching valve 22 is shown in FIG. 8. A top movable iron core 31 is connected to an electromagnetic valve core 28. The electromagnetic valve core 28 is sleeved with a static iron core 25. A coil 24 is disposed in the static iron core 25. An electromagnetic valve return spring 27 is disposed in a lower end groove of the electromagnetic valve core 28. An upper valve core sealing ring 30 is disposed between the electromagnetic valve core 28 and the static iron core 25, while a middle valve core sealing ring 29 is provided to sleeve the middle of the electromagnetic valve core 28 and a lower valve core sealing ring 26 is disposed between the electromagnetic valve core 28 and the valve cover 2. A static iron core sealing ring 23 is disposed between the static iron core 25, and the end cover 1 and the valve cover 2. The normally open switching valve 22 is opened when the coil 24 is de-energized such that the electromagnetic valve core 28 is situated at an upper limit position and the middle valve core sealing ring 29 comes into contact with the static iron core 25 to form a seal, thus blocking air from the air inlet b and allowing air from the air inlet a to pass from below the middle valve core sealing ring 29 to the air outlet c. The normally open switching valve 22 is closed when the coil 24 is energized such that the movable iron core 31 and the electromagnetic valve core 28 are pressed down and the middle valve core sealing ring 29 comes into contact with the valve cover 2 to form a seal, thus blocking air from the air inlet a and allowing air from the air inlet b to pass from above the middle valve core sealing ring 29 to the air outlet c.

The normally open quick-acting intake valve 3 is similar to the normally open switching valve 22 in structure and working principle. The normally open quick-acting intake valve 3 is opened when the coil is de-energized, allowing air from the air inlet d to pass from below the middle valve core sealing ring to the air outlet e. The normally open quick-acting intake valve 3 is closed when the coil is energized such that the middle valve core sealing ring comes into contact with the valve cover 2 to form a seal, thus blocking air from the air inlet d.

The quick-acting exhaust valve 19 and the quick-acting intake valve 20 are similar to the normally open quick-acting intake valve 3 in structure and working principle. The quick-acting exhaust valve 19 or the quick-acting intake valve 20 is closed when the coil is energized, thus blocking air from the air inlet for air from the air inlet h. The quick-acting exhaust valve 19 or the quick-acting intake valve 20 is opened when the coil is de-energized, allowing air from the air inlet f to pass from above the middle valve core sealing ring to the air outlet g or air from the air inlet h to pass from above the middle valve core sealing ring to the air outlet i In the lower valve body of the automatic pressure regulating valve, a piston 5 is disposed in a valve cover 2. A spring seat 9, a stop collar 11, a rubber muffler 12, a main spring 14, a spring collar 15, and a main valve core 17 are all disposed in a valve seat 8. The stop collar 11 is disposed in a bottom groove of the valve seat 8. The spring seat 9 is disposed above the stop collar 11. The main spring 14 sleeves the spring seat 9. The spring collar 15 sleeves the main spring 14. The main valve core 17 capable of moving up and down is disposed in the spring seat 9. The rubber muffler 12 is disposed in the spring seat 9 and below the main valve core 17. A first sealing ring 6 is disposed between the piston 5 and the valve cover 2. A second sealing ring 7 is disposed between the valve cover 2 and the valve seat 8. A third sealing ring 10 is disposed between the spring seat 9 and the valve seat 8. A fourth sealing ring 13 is disposed between the main valve core 17 and the spring seat 9. A fifth sealing ring 16 sleeves a middle lug boss of the main valve core 17. A sixth sealing ring 18 sleeves the top of the main valve core 17. The piston 5 is capable of moving up and down to come into contact with or separate from the sixth sealing ring 18.

Further, an air inlet j of a relay valve is connected to the air storage tank, while an air outlet k of the relay valve is connected to a brake chamber and an exhaust port 1 of the relay valve is connected to the rubber muffler.

When specifically implemented, a novel automatic pressure regulating valve for an electro-pneumatic braking system of a vehicle provided in the present disclosure can be oriented to the following four working modes: a purely manually controlled braking mode, a mode relying mainly on manually controlled braking and secondarily on electronically controlled braking, a mode relying mainly on electronically controlled braking and allowing autonomous access of manually controlled braking, and a purely electronically controlled braking mode. By introducing the structure, actions and control method of the automatic pressure regulating valve, implementation examples are described for the four working modes of the automatic pressure regulating valve, respectively.

EXAMPLE 1

When the electro-pneumatic braking system of the vehicle and the automatic pressure regulating valve are in the purely manually controlled braking mode, the normally open switching valve 22, the normally open quick-acting intake valve 3, the quick-acting exhaust valve 19 and the quick-acting intake valve 20 are all always de-energized, and therefore, the normally open switching valve 22 and the normally open quick-acting intake valve 3 are opened while the quick-acting exhaust valve 19 and the quick-acting intake valve 20 are closed. In the upper valve body, only the pedal valve, the normally open switching valve 22, the normally open quick-acting intake valve 3 and the control chamber A are communicated to form a closed loop. The pressure of the control chamber A can only be regulated by a driver controlling the opening of the pedal valve. When the driver does not step on the brake pedal, the pedal valve is closed. The piston 5 is in contact with the sixth sealing ring 18 under the action of its own gravity. The working chamber B is disconnected from the exhaust port 1. The main valve core 17 and the fifth sealing ring 16 are kept in contact with the valve seat 8 under the action of the spring force of the main spring 14. When the intake valve is closed, the air inlet j and the air outlet k of the working chamber B of the relay valve are disconnected, and the vehicle is in a non-braking state. When the driver steps on the brake pedal, the opening of the pedal valve becomes larger, allowing air to enter the control chamber A through the loop formed by the pedal valve, the normally open switching valve 22 and the normally open quick-acting intake valve 3. The pressure in the control chamber A rises to push the piston 5 and the main valve core 17 to move downwards such that the intake valve is opened. Thus, air from the air storage tank is allowed to enter the working chamber B through the air inlet j to create a certain pressure and then reaches the brake chamber from the air outlet k, thereby completing the service braking. In this process, the piston 5 is always in contact with the sixth sealing ring 18, the exhaust valve is closed, and the working chamber B is disconnected from the exhaust port 1. When the driver releases the brake pedal, the opening of the pedal valve decreases, and the air in the control chamber A is vented to the outside from the pedal valve through the loop formed by the control chamber A, the normally open quick-acting intake valve 3 and the normally open switching valve 22. Accordingly, the pressure in the control chamber A drops, the main valve core 17 is pushed by the spring force of the main spring 14 to move upwards, further causing the fifth sealing ring 16 to be in contact with the valve seat 8 to close the intake valve. Meanwhile, since the pressure in the working chamber B is greater than the pressure in the control chamber A, the piston 5 moves upwards to separate from the sixth sealing ring 18 such that the exhaust valve is opened to vent the air in the working chamber B to the outside via the exhaust port 1 until the state where the piston 5 is in contact with the sixth sealing ring 18 under its own gravity and the exhaust valve is closed is recovered. At this point, the pressure relief of the working chamber B is completed, and the vehicle is released from the service braking.

EXAMPLE 2

When the electro-pneumatic braking system of the vehicle and the automatic pressure regulating valve are in the mode relying mainly on manually controlled braking and secondarily on electronically controlled braking, a target braking pressure $P_1$ of the brake chamber is calculated by the vehicle system according to human/vehicle/road conditions, and the outlet pressure $P_2$ of the automatic pressure regulating valve is produced by braking performed by the driver at this point. A pressure sensor connected to a pressure detection hole m feeds back the real-time outlet pressure $P_2$ a controller 32 for comparison with the target braking pressure $P_1$. If the difference between the outlet pressure and the target braking pressure is within an acceptable range, the brake is still braked by manual control without involving electronic control (see Example 1 for the specific implementation). If the difference between the target braking pressure $P_1$ and the outlet pressure $P_2$ is beyond the acceptable range, it is regarded that the driver makes a misoperation. This may be specifically divided into the following two cases: insufficient braking if the target braking pressure $P_1$ is higher than the outlet pressure $P_2$, and excessive braking if the target braking pressure $P_1$ is lower than the outlet pressure $P_2$. When the electro-pneumatic braking system of the vehicle and the automatic pressure regulating valve are in the mode relying mainly on manually controlled braking and secondarily on electronically controlled braking, air from the pedal valve may enter the control chamber A through the loop formed by the pedal valve, the normally open switching valve 22 and the normally open quick-acting intake valve 3, creating a certain control pressure. If the vehicle system determines that insufficient braking occurs, the vehicle system calculates a correction for improper manual braking from the target braking pressure $P_1$ and the outlet pressure $P_2$ and transmits the calculated correction to the controller 32. The controller 32 gives a signal to control the coil of the quick-acting intake valve 20 to be energized such that the air inlet h and the air outlet i thereof are communicated with each other, allowing air from the air storage tank to enter the control chamber A through the loop formed by the air storage tank and the quick-acting intake valve 20. The original pressure of the control chamber A is thus increased such that the piston 5 moves down to push the main valve core 17 and the main spring 14 to increase the opening of the intake valve. Meanwhile, the working chamber B remains disconnected from the exhaust port 1, i.e., the exhaust valve remains closed. The air from the air storage tank enters the working chamber B through the air inlet j, causing the outlet pressure $P_2$ to rise until the outlet pressure $P_2$ increases to the target braking pressure $P_1$. After the controller 32 receives the signal of the outlet pressure $P_2$ fed back by the pressure sensor and completes the comparison, the controller 32 gives a signal to control the coil of the normally open quick-acting intake valve 3 to be energized and the coil of the quick-acting intake valve 20 to be de-energized, thus breaking the connection between the air inlet d and the air outlet e of the normally open quick-acting intake valve 3 and the connection between the air inlet h and the air outlet i of the quick-acting intake valve 20, i.e., blocking the loop formed by the pedal valve, the normally open switching valve 22, the normally open quick-acting intake valve 3 and the control chamber A and the loop formed by the air storage tank, the quick-acting intake valve 20 and the control chamber A. The main valve core 17 is caused to move upwards under the action of the spring force of the main spring 14 to close the intake valve. The piston 5 is still in contact with the sixth sealing ring 18, i.e., the exhaust valve is closed, and the outlet pressure $P_2$ of the working chamber B remains stable. If the vehicle system determines that excessive braking occurs, the vehicle system calculates a correction for improper manual braking from the target braking pressure $P_1$ and the outlet pressure $P_2$ and transmits the calculated correction to the controller 32. The controller 32 gives a signal to control the coils of the normally open quick-acting intake valve 3 and the quick-acting exhaust valve 19 to be energized such that the air inlet d and the air outlet e of the normally open quick-acting intake valve 3 are disconnected and the air inlet f and the air outlet g of the quick-acting exhaust valve are communicated with each other. In other words, the loop formed by the pedal valve, the normally open switching valve 22, the normally open quick-acting intake valve 3 and the control chamber A is blocked, while the loop formed by the control chamber A, the quick-acting exhaust valve 19 and the muffler 21 is not. The air in the control chamber A is vented to the outside through the quick-acting exhaust valve 19 and the muffler 21, causing the pressure of the control chamber A to drop. The main valve core 17 is driven by the spring force of the main spring 14 to move upwards to close the intake valve. The piston 5 continues to move upwards under the action of the pressures of the working chamber B and the control chamber A to separate from the sixth sealing ring 18. Accordingly, the exhaust valve is opened to vent the air in the working chamber B to the outside through the exhaust port 1, causing the pressure of the working chamber B to drop until the outlet pressure $P_2$ decreases to the target braking pressure $P_1$. The controller 32 then controls the coil of the quick-acting exhaust valve 19 to be de-energized, thus breaking the connection between the air inlet f and the air outlet g of the quick-acting exhaust valve, i.e., blocking the loop formed by the control chamber A, the quick-acting exhaust valve 19 and the muffler 21. The piston 5 moves down under the combined action of its own gravity and the pressures of the control chamber A and the working chamber B to come into contact with the sixth sealing ring 18 to close the exhaust valve such that the outlet pressure $P_2$ of the working chamber B remains stable. The above process is repeated so that the output pressure $P_2$ can be regulated to be equal to the target pressure $P_1$.

EXAMPLE 3

When the electro-pneumatic braking system of the vehicle and the automatic pressure regulating valve are in the mode relying mainly on electronically controlled braking and allowing autonomous access of manually controlled braking, the controller 32 enables the coils of the normally open switching valve 22 and the normally open quick-acting intake valve 3 to be energized such that the air inlet a and the air outlet c of the normally open switching valve 22 are disconnected, the air inlet b and the air outlet c are communicated with each other and the air inlet d and the air outlet e of the normally open quick-acting intake valve 3 are disconnected. Thus, the manually controlled braking loop is blocked, and the vehicle system determines whether braking is needed according to the human/vehicle/road conditions. If braking is needed, the target braking pressure $P_1$ desired by the brake chamber is calculated. The pressure sensor monitors in real time and feeds back the outlet pressure $P_2$ of the working chamber B to the controller 32. At this point, the coils of the normally open quick-acting intake valve 3, the quick-acting exhaust valve 19 and the quick-acting intake valve 20 are all de-energized, and only the air inlet d and the air outlet e of the normally open quick-acting intake valve 3 are communicated with each other, i.e., the loop formed by the air storage tank, the normally open switching valve 22, the normally open quick-acting intake valve 3 and the control chamber A is enabled. The pressure of the control chamber A thus rises such that the piston 5 moves down to push the main valve core 17 and the main spring 14, thereby increasing the opening of the intake valve. Meanwhile, the working chamber B remains disconnected from the exhaust port 1, i.e., the exhaust valve remains closed. The air from the air storage tank enters the working chamber B through the air inlet j, causing the outlet pressure $P_2$ to rise until the outlet pressure $P_2$ increases to the target braking pressure $P_1$. The controller 32 controls the coil of the normally open quick-acting intake valve 3 to be energized and the coil of the quick-acting intake valve 20 to be de-energized, thus breaking the connection between the air inlet d and the air outlet e of the normally open quick-acting intake valve 3, i.e., blocking the intake loop of the control chamber A. The main valve core 17 is caused to move upwards under the action of the spring force of the main spring 14 to close the intake valve. The piston 5 is still in contact with the sixth sealing ring 18, i.e., the exhaust valve is closed, and the outlet pressure $P_2$ of the control chamber B remains stable. If it is detected that the outlet pressure $P_2$ is higher than the target braking pressure $P_1$ during braking, the controller 32 gives a signal to control both of the coil of the normally open quick-acting intake valve 3 and the coil of the quick-acting exhaust valve 19 to be energized, thus blocking the loop formed by the air storage tank, the normally open switching valve 22, the normally open quick-acting intake valve 3 and the control chamber A. The air in the control chamber A is vented to the outside through the quick-acting exhaust valve 19 and the muffler 21, causing the pressure of the control chamber A to drop. The main valve core 17 is driven by the spring force of the main spring 14 to move upwards to close the intake valve. The piston 5 continues to move upwards under the action of the pressures of the working chamber B and the control chamber A to separate from the sixth sealing ring 18. Accordingly, the exhaust valve is opened to vent the air in the working chamber B to the outside through the exhaust port 1, causing the pressure of the working chamber B to drop until the outlet pressure $P_2$ decreases to the target braking pressure $P_1$. The controller 32 then controls the coil of the quick-acting exhaust valve 19 to be de-energized, thus breaking the connection between the air inlet f and the air outlet g of the quick-acting exhaust valve, i.e., blocking the loop formed by the control chamber A, the quick-acting exhaust valve 19 and the muffler 21. The piston 5 moves down under the combined action of its own gravity and the pressures of the control chamber A and the working chamber B to come into contact with the sixth sealing ring 18 to close the exhaust valve such that the outlet pressure $P_2$ of the working chamber B remains stable. In this mode, if the driver actively intervenes in the braking control, the sensor on the brake pedal may acquire a signal at the moment when the driver steps on the brake pedal. Whether the severity of braking exceeds a specified threshold is determined, and if yes, the normally open switching valve 22, the normally open quick-acting intake valve 3 and the quick-acting exhaust valve 19 are de-energized, causing the air inlet a to be communicated with the air outlet c, the air inlet d to be communicated with the air outlet e and the air inlet f to be disconnected from the air outlet g. Thus, the loop formed by the pedal valve-normally open switching valve 22, the normally open quick-acting intake valve 3 and the control chamber A is enabled, while the loop formed by the control chamber A, the quick-acting exhaust valve 19 and the muffler 21 is blocked. The driver can regulate the pressure of the control chamber A by means of the pedal valve and then regulate the pressure of the working chamber B to achieve vehicle braking.

EXAMPLE 4

When the electro-pneumatic braking system of the vehicle and the automatic pressure regulating valve are in the purely electronically controlled braking mode, the controller 32 enables the coil of the normally open switching valve 22 to be always energized such that the air inlet b and the air outlet c are communicated with each other. Thus, the manually controlled braking loop is blocked, and the vehicle system determines whether braking is needed according to the human/vehicle/road conditions. When vehicle braking is undesired, the coil of the normally open quick-acting intake valve 3 is energized, while the coils of the quick-acting exhaust valve 19 and the quick-acting intake valve 20 are de-energized, causing both of the intake loop and the exhaust loop of the control chamber A to be blocked. The piston 5 comes into contact with the sixth sealing ring 18 under its own gravity to close the exhaust valve. The main valve core 17 and the fifth sealing ring 16 keep contact with the valve seat 8 under the action of the spring force of the main spring 14, and the intake valve is closed, causing the vehicle to be in the non-braking state. When vehicle braking is desired, the vehicle system calculates the target braking pressure $P_1$ desired by the brake chamber. The pressure sensor monitors in real time and feeds back the outlet pressure $P_2$ of the working chamber B to the controller 32. The controller 32 enables the coil of the normally open quick-acting intake valve 3 to be de-energized such that the air inlet d and the air outlet e of the normally open quick-acting intake valve 3 are communicated with each other and the loop formed by the air storage tank, the loop formed by the air storage tank, the normally open switching valve 22, the normally open quick-acting intake valve 3 and the control chamber A is enabled. The pressure of the control chamber A thus rises such that the piston 5 moves down to push the main valve core 17 and the main spring 14, thereby increasing the opening of the intake valve. Meanwhile, the working chamber B remains disconnected from the exhaust port 1, i.e., the exhaust valve remains closed. The air from the air storage tank enters the working chamber B through the air inlet j, causing the outlet pressure $P_2$ to rise until the outlet pressure $P_2$ increases to the target braking pressure $P_1$. The controller 32 controls the coil of the normally open quick-acting intake valve 3 to be energized, thus breaking the connection between the air inlet d and the air outlet e of the normally open quick-acting intake valve 3, i.e., blocking the intake loop of the working chamber. The main valve core 17 is caused to move upwards under the action of the spring force of the main spring 14 to close the intake valve. The piston 5 is still in contact with the sixth sealing ring 18, i.e., the exhaust valve is closed, and the outlet pressure $P_2$ of the working chamber B remains stable. When the outlet pressure $P_2$ is higher than the target braking pressure $P_1$, the controller 32 controls both of the coil of the normally open quick-acting intake valve 3 and the coil of the quick-acting exhaust valve 19 to be energized, thus blocking the intake loop of the control chamber A and enabling the exhaust loop of the control chamber A. The air in the control chamber A is vented to the outside through the quick-acting exhaust valve 19 and the muffler 21, causing the pressure of the control chamber A to drop. The main valve core 17 is driven by the spring force of the main spring 14 to move upwards to close the intake valve. The piston 5 continues to move upwards under the action of the pressures of the working chamber B and the control chamber A to separate from the sixth sealing ring 18. Accordingly, the exhaust valve is opened to vent the air in the working chamber B to the outside through the exhaust port 1, causing the pressure of the working chamber B to drop until the outlet pressure $P_2$ decreases to the target braking pressure $P_1$. The controller 32 then controls the coil of the quick-acting exhaust valve 19 to be de-energized, thus blocking the exhaust loop of the control chamber A. The piston 5 moves down under the combined action of its own gravity and the pressures of the control chamber A and the working chamber B to come into contact with the sixth sealing ring 18 to close the exhaust valve such that the outlet pressure $P_2$ of the working chamber B remains stable. The above process is repeated so that the output pressure $P_2$ can be regulated to be equal to the target pressure $P_1$. When the vehicle system determines that the braking is completed, the controller 32 controls the coil of the quick-acting exhaust valve 19 to be energized, thus enabling the exhaust loop of the control chamber A to completely relieve the pressure of the control chamber A. The piston 5 and the main valve core 17 move upwards under the combined action of the spring force of the main spring 14 and the pressure of the working chamber B to close the intake valve and open the exhaust valve. Thus, the air in the working chamber B is vented to the outside through the exhaust port 1 to completely relieve the pressure of the working chamber B. The piston 5 comes into contact with the sixth sealing ring 18 under its own gravity to close the exhaust valve. Finally, the outlet pressure $P_2$ drops to a non-braking level, and the service braking is completed.

In any of the above examples, when the vehicle is out of order to cause failure of the electro-pneumatic braking system, the controller 32, the normally open switching valve 22, the normally open quick-acting intake valve 3, the quick-acting exhaust valve 19 and the quick-acting intake valve 20 are all de-energized. However, the electro-pneumatic braking system and the automatic pressure regulating valve are still capable of manually controlled braking (see Example 1 for the specific control method).

To sum up, an automatic pressure regulating valve for an electro-pneumatic braking system of a commercial vehicle and a control method thereof disclosed herein have the following beneficial effects: by utilizing the automatic pressure regulating valve as the core pressure regulating element of the electro-pneumatic braking system of the vehicle, the braking pressure response time is effectively shortened, and real-time accurate regulation of the pressure of the brake chamber as required by braking is realized. The "fail-safe" function of braking is maintained. In case of failure of the electronically controlled system, the driver can directly step on the brake pedal in the cab to perform braking without extra operation. In short, a reliable braking solution is proposed for automatic vehicle driving.

Finally, it should be noted that the above examples are merely intended to explain rather than limit the technical solutions of the present disclosure. Although the present disclosure is described in detail with reference to the above examples, those of ordinary skill in the art will understand that they may still make modifications to the technical solutions described in the above examples or make equivalent replacements to some or all technical features thereof, which do not make the essence of corresponding technical solutions depart from the scope of the technical solutions in the examples of the present disclosure.

In addition, those skilled in the art can understand that, although some examples herein include some features included in other examples but not other features, a combination of features of different examples falls within the scope of the present disclosure and forms a different example. For example, in the claims, any one of the claimed examples can be used in any combination. The information disclosed in "BACKGROUND ART" is merely intended to deepen the understanding of the general background art of the present disclosure, and should not be regarded as an acknowledgement or any form of suggestion that this information constitutes the prior art commonly known to those skilled in the art.

What is claimed is:

1. An automatic pressure regulating valve for an electro-pneumatic braking system of a commercial vehicle, comprising an upper valve body and a lower valve body, wherein the upper valve body comprises a normally open switching valve, a quick-acting intake valve, a normally open quick-acting intake valve, a quick-acting exhaust valve, and a control chamber A; the lower valve body comprises a relay valve and a working chamber B; the control chamber A is located above a piston, while the working chamber B is located below the piston; the control chamber A and the working chamber B are separated by the piston, and the piston is movable between the control chamber A and the working chamber B; the normally open switching valve has a manually controlled air inlet a and an electronically controlled air inlet b that are connected to a pedal valve and an air storage tank, respectively, and an air outlet c connected to an air inlet d of the normally open quick-acting intake valve; an air outlet g of the quick-acting exhaust valve is connected to a first muffler; an air inlet h of the quick-acting intake valve is connected to the air storage tank; and an air outlet e of the normally open quick-acting intake valve, an air inlet f of the quick-acting exhaust valve and an air outlet i of the quick-acting air intake valve are connected together to the control chamber A.

2. The automatic pressure regulating valve according to claim 1, wherein the piston is disposed in a valve cover; an upper protrusion structure of the piston cooperates with a guide groove of the valve cover for guiding the piston; a spring seat, a stop collar, second muffler, a main spring, a spring collar, and a main valve core are all disposed in a valve seat; the stop collar is disposed in a bottom groove of the valve seat; the spring seat is disposed above the stop collar; the main spring sleeves the spring seat; the spring collar sleeves the main spring; the main valve core capable of moving up and down is disposed in the spring seat; the second muffler is disposed in the spring seat and below the main valve core; a first sealing ring is disposed between the piston and the valve cover; a second sealing ring is disposed between the valve cover and the valve seat; a third sealing ring is disposed between the spring seat and the valve seat; a fourth sealing ring is disposed between the main valve core and the spring seat; a fifth sealing ring sleeves a middle lug boss of the main valve core; a sixth sealing ring sleeves the top of the main valve core; the piston is capable of moving up and down to come into contact with or separate from the sixth sealing ring; the working chamber B has an air inlet j connected to the air storage tank of the electro-pneumatic braking system of the vehicle, an air outlet k connected to a brake chamber and an exhaust port 1 connected to the second muffler; the piston moves down to push the main valve core to compress the main spring, thereby communicating the air inlet j and the air outlet k of the working chamber B; the main valve core is driven by a spring force of the main spring to move upwards to break the connection between the air inlet j and the air outlet k of the working chamber B; and the working chamber B is communicated with the exhaust port 1 when a lower side of the piston is separated from the sixth sealing ring at the top of the main valve core.

3. The automatic pressure regulating valve according to claim 1, wherein the air inlet a and the air outlet c of the normally open switching valve are normally open; the air inlet d and the air outlet e of the normally open quick-acting intake valve are normally open; the air inlet f and the air outlet g of the quick-acting exhaust valve are normally closed; the air inlet h and the air outlet i of the quick-acting intake valve are normally closed; manually controlled braking and electronically controlled braking are switched by de-energizing and energizing the normally open switching valve; when the normally open switching valve is de-energized, the manually controlled air inlet a is communicated with the air outlet c, and the manually controlled braking is maintained; when the normally open switching valve is energized, the electronically controlled air inlet b is communicated with the air outlet c to enable electronically controlled braking; and an outlet pressure of the automatic pressure regulating valve is regulated as required.

4. The automatic pressure regulating valve according to claim 1, wherein a movable iron core is disposed at the top of the normally open switching valve in the upper valve body; the movable iron core is connected to an electromagnetic valve core which is sleeved with a static iron core; a coil is disposed in the static iron core; an electromagnetic valve return spring is disposed in a lower end groove of the electromagnetic valve core; an upper valve core sealing ring is disposed between the electromagnetic valve core and the static iron core, while a middle valve core sealing ring sleeves the middle of the electromagnetic valve core and a lower valve core sealing ring is disposed between the electromagnetic valve core and a valve cover; a static iron core sealing ring is disposed between the static iron core, and an end cover and the valve cover; when the coil is de-energized, the movable iron core and the electromagnetic valve core are situated at an upper limit position under the action of a spring force, and the manually controlled air inlet a is communicated with the air outlet c; and when the coil is energized, the movable iron core presses down the electromagnetic valve core and the spring, and the electronically controlled air inlet b is communicated with the air outlet c.

5. The automatic pressure regulating valve according to claim 1, wherein an annular sharp protrusion structure is formed on a lower portion of the piston to achieve a linear seal between the piston and the main valve core.

6. The automatic pressure regulating valve according to claim 1, wherein the normally open quick-acting intake valve has only one air inlet d which is connected to the air outlet c of the normally open switching valve; when a coil of the normally open quick-acting intake valve is de-energized, the air inlet d is communicated with the air outlet e; and when the coil of the normally open quick-acting intake valve is energized, the air inlet d is disconnected from the air outlet e.

7. The automatic pressure regulating valve according to claim 1, wherein the quick-acting exhaust valve and the quick-acting intake valve are normally closed; the air inlet and the air outlet of each of the quick-acting exhaust valve and the quick-acting intake valve are disconnected at the beginning; and when the coil is energized, the movable iron core is attracted to move downwards to press down the electromagnetic valve core and a spring such that the air inlet is communicated with the air outlet.

8. The automatic pressure regulating valve according to claim 1, wherein when the normally open switching valve, the normally open quick-acting intake valve, the quick-acting exhaust valve and the quick-acting intake valve are all de-energized, air from the pedal valve is capable of entering the control chamber A through the normally open switching valve and the normally open quick-acting intake valve to enable the manually controlled braking in a non-electronic control state.

9. A method for controlling an automatic pressure regulating valve for an electro-pneumatic braking system of a commercial vehicle, comprising the following steps:

(1) setting, by the electro-pneumatic braking system of the commercial vehicle, a target braking pressure $P_1$ based on actuation for a brake pedal and a driving state of the vehicle, or based on only the driving state of the vehicle;

(2) converting, by a controller, the target braking pressure into a control signal, and regulating a pressure of a control chamber A by controlling de-energization and energization of coils of a normally open switching valve, a normally open quick-acting intake valve, a quick-acting exhaust valve and a quick-acting intake valve coil;

(3) detecting, by a pressure sensor, a pressure $P_2$ at a pressure outlet of a working chamber B, and feeding back the pressure to the controller for comparison with the target braking pressure $P_1$;

(4) when $P_2$ is lower than $P_1$, controlling, by the controller, opening and closing of the normally open switching valve, the normally open quick-acting intake valve, the quick-acting exhaust valve, and the quick-acting intake valve, increasing the pressure of the control chamber A and increasing the opening of an intake valve of the automatic pressure regulating valve, causing $P_2$ to rise;

(5) when $P_2$ is higher than $P_1$, controlling, by the controller, opening and closing of the normally open switching valve, the normally open quick-acting intake valve, the quick-acting exhaust valve, and the quick-acting intake valve, reducing the pressure of the control chamber A, closing the intake valve of the automatic pressure regulating valve and opening an exhaust valve of the automatic pressure regulating valve causing $P_2$ to drop; and (6) controlling, by the controller, the normally open switching valve, the normally open quick-acting intake valve, the quick-acting exhaust valve, and the quick-acting intake valve to act repeatedly, and regulating an outlet pressure of the automatic pressure regulating valve.

\* \* \* \* \*